United States Patent
Fishman et al.

(10) Patent No.: US 7,660,537 B2
(45) Date of Patent: Feb. 9, 2010

(54) SIMULTANEOUS ELECTRICAL PRE-COMPENSATION OF SELF-PHASE MODULATION AND CHROMATIC DISPERSION

(75) Inventors: Daniel A. Fishman, Lakewood, NJ (US); Xiang Liu, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 570 days.

(21) Appl. No.: 11/367,141

(22) Filed: Mar. 3, 2006

(65) Prior Publication Data

US 2007/0206954 A1 Sep. 6, 2007

(51) Int. Cl.
*H04B 10/04* (2006.01)
(52) U.S. Cl. .................. 398/193; 398/162; 398/158; 398/159; 398/33; 398/141
(58) Field of Classification Search .............. 398/182, 398/183, 159, 158, 147, 192, 193, 194, 195, 398/196, 197, 198, 202, 208, 209, 214, 30, 398/31, 33, 38, 141, 81, 162, 200, 25, 26, 398/27
See application file for complete search history.

(56) References Cited

U.S. PATENT DOCUMENTS 7,382,985 B2 * 6/2008 Roberts et al. ............ 398/159
2004/0197103 A1 * 10/2004 Roberts et al. ............ 398/159

OTHER PUBLICATIONS

J. McNicol et al., "Electrical Domain Compensation of Optical Dispersion," OFC'05, paper OTHJ3, 2005.
D. McGhan et al., "5120 km RZ-DPSK Transmission Over G652 Fiber at 10 Gb/s With No Optical Dispersion Compensation," OFC'05, postdeadline paper PDP 27, 2005.
M. El Said et al., "An Electrically Pre-Equalized 10-Gb/s Duobinary Transmission System," J. Lightwave Technol, vol. 23, No. 1, pp. 388-400, Jan. 2005.
M. S. O'Sullivan et al., "Electronic Dispersion Compensation Techniques for Optical Communication Systems," ECOC'05, paper Tu3.2.1, 2005.
R. I. Killey et al., "Electronic Precompensation Techniques to Combat Dispersion and Nonlinearities in Optical Transmission," ECOC'05, paper Tu4.2.1, 2005.
R-J. Essiambre and P. J. Winzer, "Fibre Nonlinearities in Electronicallhy Pre-Distorted Transmission," ECOC'05, paper Tu3.2.2, 2005.
P. J. Winzer and R-J. Essiambre, "Electronic Pre-Distortion for Advanced Modulation Formats," ECOC'05, paper Tu4.2.2, 2005.

* cited by examiner

*Primary Examiner*—Hanh Phan
(74) *Attorney, Agent, or Firm*—Wall & Tong, LLP

(57) ABSTRACT

The present invention includes a fast algorithm to compute the pre-equalized waveform for simultaneous compensation of the self-phase modulation and chromatic dispersion experienced by a high-speed optical signal, e.g., at 10 Gb/s, and shows that it is used for an automatic self-adapting pre-equalization when the knowledge on transmission link details is inaccurate or incomplete.

26 Claims, 2 Drawing Sheets though skilled in the art and informed by the teachings therein will realize that the invention is also applicable to any apparatus and method that involves improving signal quality in a communication network.

SIMULTANEOUS ELECTRICAL PRE-COMPENSATION OF SELF-PHASE MODULATION AND CHROMATIC DISPERSION

FIELD OF THE INVENTION

The invention relates to the field of optical telecommunications, and more particularly, to simultaneous electrical pre-compensation of self-phase modulation (SPM) and chromatic dispersion (CD).

BACKGROUND OF THE INVENTION

Electrical pre-equalization of fiber chromatic dispersion (EPE-CD) allows optical communication systems to compensate for chromatic dispersion (CD) without utilizing in-line optical dispersion compensators (ODCs). CD compensation without using ODCs reduces the overall cost of the optical communication systems. In optical fiber transmission using the EPE-CD scheme, self-phase-modulation (SPM), resulting from the fiber nonlinearity, causes a more severe penalty than in conventional dispersion-managed transmission using ODCs. Pre-SPM-equalization, which pre-equalizes the waveform to compensate for the SPM-induced waveform distortion, mitigates the SPM penalty. In order to realize the pre-SPM-compensation, sophisticated computation is needed to reversely solve the nonlinear Schrödinger equation (NLSE) governing the dispersive and nonlinear propagation of the signal in a fiber link. This calculation requires precise knowledge of distance-dependent signal power, fiber nonlinear coefficient, and dispersion. It also requires extensive computation effort that is too time-consuming to be useful in networks that carry dynamically routed channels.

SUMMARY

The present invention improves upon the prior art by providing, in accordance with one embodiment of the present invention, a fast algorithm to compute the pre-equalized waveform for simultaneous compensation of the SPM and CD experienced by an optical signal. The computation does not require the knowledge of the detailed signal power changes within each fiber segment and does not need to solve the NLSE equation within each segment. The computation time can be dramatically reduced by more than 100 times. Furthermore, system parameters such as path-averaged signal power, fiber nonlinear coefficient, and/or dispersion are no longer required. The computation is capable of providing a fast "self-adapting" compensation for both SPM and CD in the EPE scheme.

DETAILED DESCRIPTION OF THE INVENTION

Figure 1:
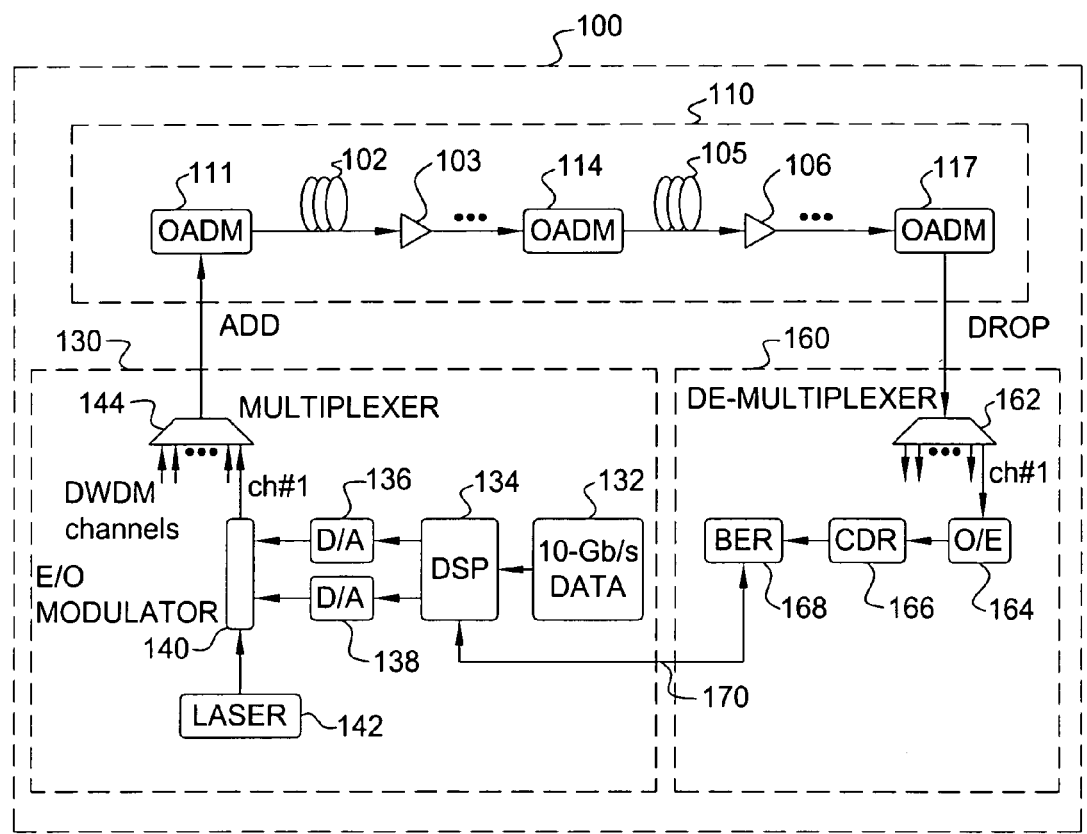
FIG. 1 depicts a high-level block diagram of an optical communication system according to one embodiment of the present invention.

The following merely illustrates the principles of the invention. The invention is primarily described within the context of a simultaneous electrical pre-compensation of self-phase modulation (SPM) and chromatic dispersion (CD). However, FIG. 1 depicts a high-level block diagram of an optical communication system 100 according to one embodiment of the present invention. In one embodiment, the optical communication system 100 is a synchronous optical network (SONET) for transmission of an optical signal. In another embodiment, the communication system 100 is an internet protocol (IP) based communication system. In a further embodiment, the network has a ring topology. In another embodiment, the network is a star network. Other networks and combination of networks, e.g., hybrid networks, may be included in the communication system 100. The optical communication system 100 includes a fiber link 110, a transmitting portion 130, a receiving portion 160, and a performance communication link 170.

Illustratively, the fiber link 110 includes a plurality of optical add/drop multiplexers (OADM) 111, 114, 117, a plurality of optical fibers 102, 105, and a plurality of fiber amplifiers 103, 106.

The fiber link 110 carries an optical signal having a plurality of channels following ANSI or ITU standard. In one embodiment, a first OADM 111 receives the optical signal. The first OADM 111 adds information from a local network to a channel of the signal on the fiber link 110. The information is dropped at the destination OADM 117. The optical signal is transmitted over a first span 102 of the fiber link 110 where it is subjected to SPM and CD. Then, the optical signal is amplified in amplifier 103. In one embodiment, amplifier 103 is an erbium-doped fiber amplifier (EDFA). In other embodiments, amplifiers such as Raman amplifiers may be used. The amplified signal is transmitted to a second OADM 114 where other channels of the optical signal are added and/or dropped. The fiber link 110 includes a plurality of other optical elements such as a second span 105 of the fiber link 110 and a second amplifier 106. After the optical signal traversed a plurality of optical components on the fiber link, the destination OADM 117 receives the optical signal. The destination OADM 117 drops the channel containing the information added at the first OADM 111.

The transmitting portion 130 produces the optical signal to be added to the OADM 111. The optical signal includes dense wavelength division multiplexing (DWDM) channels. The pre-equalization of the SPM and CD occurs at the transmitting portion. In one embodiment, pre-equalization is first performed on each channel individually. Then, each channel is multiplexed and added to the optical signal of the fiber link 110. The transmitting portion 130 includes a data source 132, a digital signal processor (DSP) 134, two digital-to-analog (D/A) converters 136 and 138, a modulator 140, a laser 142, and a multiplexer 144.

The signal source 132 provides information data to be transmitted to another location. In one embodiment, the optical signal at the transmitting portion is from conventional networks such as an optical ring or an optical local area network (LAN). In one embodiment, the optical signal is a DWDM signal. In another embodiment, the optical signal is coarse wavelength division multiplexing (CWDM). The optical signal may be multiplexed using any other types of WDM strategies. In one embodiment, the optical signal is transmitted at 10 Gb/s. In another embodiment, the optical signal is transmitted at 2.5 Gb/s. The optical signal may be transmitted at any transmission speed of the source network.

The DSP 134 receives a digital signal including the information to be transmitted to another location. The DSP includes a memory and a look-up table. The memory stores the bits of the received signal data for analysis. The look-up table includes a database of the waveforms to be used for the in-phase (I) and quadrature (Q) modulations. The I and Q modulations are required for pre-compensation of the SPM and CD experienced by the signal in the optical fiber link 110. The database contains the "pre-equalized" waveforms for all possible data patterns with a pre-determined pattern length. In one embodiment, the DSP electronically computes the desired "pre-equalized" waveforms by utilizing a set of system parameters such as the distance of the fiber link that the optical signal has to travel, the total CD experienced by the signal during the transmission over the fiber link, $D_{total}$, the total SPM-induced nonlinear phase shift experienced by the signal during the transmission over the fiber link, $\Phi_{NL}$, the signal data rate and pulse format, the number of amplified fiber spans, M, and other characteristics of the fiber link. In another embodiment, the DSP electronically computes the desired "pre-equalized" waveforms by utilizing a set of "guessed" system parameters such as $D_{total}$, $\Phi_{NL}$, and a guessed number of amplified fiber spans, N, and other characteristics of the fiber link. The DSP further utilizes the information regarding the quality of the received signal, with the help of the performance communication link 170, to improve iteratively the set of guessed parameters such that the transmission performance is optimized automatically. This method of "self-adapting" pre-equalization of CD and SPM is very valuable in transmission systems where the detailed system parameters are not available.

In one embodiment, the DSP analyzes a few bits at a time. In another embodiment, the DSP analyzes the bit by groups of approximately 100 bits. The pattern length of the bit group varies and is determined by the total CD presented in the transmission link and the signal data rate and format. After analyzing the bits, such as a group having 100 bits, the DSP determines the desired I and Q waveforms by retrieving the computed pre-equalized patterns from the look-up table. In one embodiment, the optical link is a 1,000 Km fiber link with a known fiber type and signal power evolution. The amount of distortion in this link is reversely determined. That distortion is then modulated in the transmitted signal in anticipation of the CD and SPM that the signal will experience over the fiber link. Instead of a clean signal at the transmitter portion, the transmitted signal represents a pre-equalized or pre-distorted complex waveform anticipating the effects of chromatic dispersion and nonlinearity of the fiber link. After traversing the fiber link, the pre-equalized optical signal becomes the target signal that is recovered at the receiving portion.

The pre-equalized optical signal is a signal that in effect predicts the amount of dispersion and nonlinear effects that should result from transmission of the signal through the fiber link. The purpose of the pre-equalization is to cancel out the distortions in the fiber link. At the receiving portion of the transmission, the dispersion and nonlinearity of the fiber link cancel out the distortion intentionally imposed on pre-equalized signal so that the received optical signal at the receiving portion has almost no distortion.

In another embodiment, the received signal quality is determined at the receiving portion, and the quality information is sent back to the DSP of the transmitter portion for analysis using a feedback control loop. The computation algorithm needed for the self-adapting pre-equalization is discussed further in FIG. 2.

The D/A converters 136 and 138 convert the digital signals from the DSP to analog waveforms, which then drive the modulator 140 by transferring the "pre-equalized" pattern determined by the DSP onto the optical wave of the laser through I and Q modulations. The optical signal traversing the fiber link 110 has two attributes that change due to CD and SPM: amplitude and phase. Because the signal is distorted by amplitude and phase, there is a D/A for converting the digital in-phase component into corresponding analog waveform and another D/A for converting the digital quadrature component into corresponding analog waveforms. The I and Q modulations allow for compact transformation of the optical waveform.

The laser 142 provides an optical carrier signal to the modulator 140. Each channel of the DWDM contains information carried on an optical signal generated by its corresponding laser.

The modulator 140 encodes the information from the data source 132 onto the optical wave provided by the laser 142. The modulator 140 modulates the optical signal of the laser 142 with the analog waveforms of the D/A converters 136 and 138. The modulator changes the I and Q components of the optical light wave. The D/A converters cause the modulator to change the waveform of each channel to be pre-equalized in the complex pattern determined by the DSP as described above. The modulated optical signal has very sophisticated compact patterns. The patterns correspond to a signal after distortion by a negative distance of the transmission link. In one embodiment, the modulator is a dual-drive Mach-Zehnder modulator. In one embodiment, the modulator is a nested Mach-Zehnder modulator. In one embodiment, the modulator uses on-off keying as the modulation format of the signal. In another embodiment, the modulator uses differential phase shifted keying. Other modulation formats may be used to encode the data on the optical signal. The optical signal carries the information to the multiplexer 144.

The multiplexer 144 combines a plurality of DWDM channels into a single optical channel. The first OADM 111 adds the single optical channel having the plurality of DWDM channels into the optical signal of the fiber link. In one embodiment, the multiplexer receives a plurality of optical channels from a plurality of optical sources. Each channel has a transmission rate of 10 Gb/s or 2.5 Gb/s. In another embodiment, each channel includes other transmission rates. In one embodiment, the multiplexer is an optical coupler. In another embodiment, the multiplexer is an array waveguide grating (AWG). Other optical multiplexer may be used to combine the different DWDM channels.

The OADM 111 adds the channel including the pre-equalized waveform and travels along the fiber link. The dispersion due to SPM and CD in the fiber link cancels out the distortions presented in pre-equalized signal. At the destination OADM 117, the signal becomes relatively distortion-free and is dropped at the receiving portion 160.

The receiving portion 160 includes a demultiplexer 162, an opto-electric (O/E) converter 164, a clock and data recovery circuit (CDR) 166, a bit error rate (BER) monitoring circuit 168, and a performance communication link 170.

The demultiplexer 162 separates the dropped signal channel into a plurality of DWDM channels. In one embodiment, the demultiplexer separates the signal channel into a plurality of DWDM channels. Each channel has a transmission rate of 10 Gb/s or 2.5 Gb/s. In another embodiment, each channel includes other transmission rates. In one embodiment, the demultiplexer is a optical tunable filter. In another embodiment, the demultiplexer is an AWG. Other optical demultiplexer may be used to combine the different DWDM channels.

The O/E converter 164 converts the received optical signal into electrical signal. Any commercially available O/E converters may be used.

The CDR 166 obtains, from the electric signal, the clock and data information of the originally transmitted data source. The CDR elements are also commercially available.

The BER monitoring circuit 168 allows the destination of the channel to determine the quality of the recovered data, e.g., the error rate of the received data, by analyzing the received information. The BER circuit 168 determines the amount of errors in the received information using forward error correction (FEC) technique. The error rate represents the quality of the transmission path. In another embodiment, other quality measures such as eye opening are used for monitoring the quality of the received signal.

The performance communication link 170 provides feedback information regarding the quality of the received signal from the receiving portion 160 to the transmitting portion 130. In one embodiment, the error rate information is provided to the transmission portion, through the performance communication link 170, to improve the pre-equalization process of the DSP 134 by providing more accurate data of the condition of the fiber link. In one embodiment, the performance communication link 170 is a low-speed optical link. In another embodiment, the performance communication link 170 is a wireless link.

In another embodiment, the optimal pre-equalization for CD and SPM in a transmission link is established before actual data transmission. In a further embodiment, a pseudo random bit sequence (PRBS) is used to facilitate the self-adapting pre-equalization without the need of FEC for error monitoring.

Figure 2:
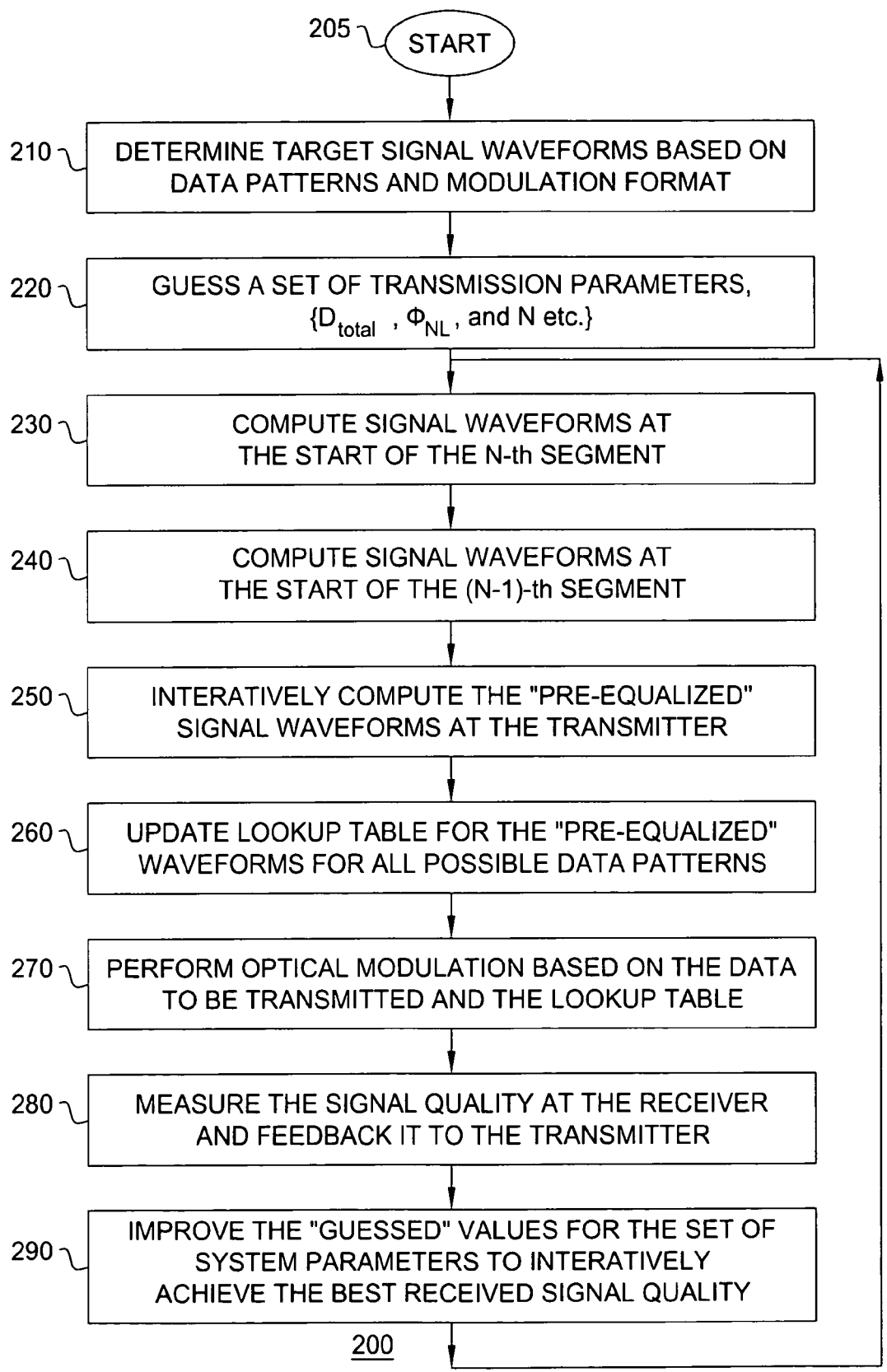
FIG. 2 illustrates a flow chart of a pre-compensation algorithm according to one embodiment of the present invention.

FIG. 2 illustrates a flow chart of a pre-compensation algorithm according to one embodiment of the present invention. The flow chart 200 depicts the steps to compute and to generate automatically an optimally pre-equalized signal for transmission over the fiber link in the optical system of FIG. 1.

At step 205, the algorithm starts.

At step 210, the target signal waveforms at the receiving portion are determined for all possible signal bit patents based on modulation format etc.

At step 220, a set of relevant system parameters is "guessed" or obtained from the network controller. In one embodiment, the set of "guessed" parameters includes values for the variables $D_{total}$, $\Phi_{NL}$, and N, where $D_{total}$ is the total dispersion, $\Phi_{NL}$ is the mean nonlinear phase shift value, and N is the number of spans. In one embodiment, the values are predefined and are set to nominal values. In another embodiment, the parameter values are values from previous transmissions or iterations. In a further embodiment, random values are used. Other "guessed" parameter values are also possible.

The pre-compensation algorithm does not require the knowledge of exact number of spans. In one embodiment, the spans are divided by actual physical sections of the optical network. In another embodiment, the spans are arbitrary segments for use by the algorithm. Each span has a chromatic dispersion value. The network controller includes the information about the path of the optical signal and allows the CD values of the segments of the path to be calculated. If the network controller does not have the CD values readily available, automatic self-adapting pre-equalization based on iterations is used to determined the CD values of the segments of the path.

In a further embodiment, fiber link with M amplified spans is divided into N artificial segments, each of which is represented by its CD value, $D(i)$ ($i=1, 2, \ldots, N$), and its mean nonlinear phase shift value, $\Phi_{NL}(i)$, $$\Phi_{NL}(i) = \gamma(i) P_{avg}(i) L(i), \quad (1)$$

where $P_{avg}(i)$ is the path-average power in the i-th segment, $L(i)$ is the length of the i-th segment, and $\gamma(i)$ is its nonlinear coefficient. In linear region, non-linear phase shift value is zero. When considering the system with non-linearity, the non-linear phase shift is usually less than $\pi$ or 3 radians over the entire fiber link. Total nonlinear phase shift value allows the pre-compensation calculation to equalize for nonlinear phase shift. In one embodiment, each segment is one span. In another embodiment, a segment includes a few connected spans.

Steps 230 to 250 depict the computing algorithm to obtain the pre-equalized optical waveforms for all possible bit patterns. To calculate the pre-equalized waveforms, first the target waveforms at the beginning of the N-th segment have to be computed. Then, the waveforms at the beginning of the N-1 segment have to be computed for the proper compensated waveforms for the beginning of the N-th segment. The compensated waveforms are calculated iteratively for each segment until the optical waveforms for the entire fiber link are calculated. Thus, the pre-equalized waveforms at the transmitting portion are obtained.

At step 230, the DSP generates the targeted signal waveform, e.g., complex time-dependent E-field of the signal, for a given bit pattern to be obtained at distance L, S(t, L). By knowing the desired targeted waveform, the DSP reversely solves the propagation equation without the need of knowing all the details of the fiber link as described below.

In one embodiment, the DSP computes the desired signal waveform for a given data pattern at the beginning of the N-th segment, S(t,N), as $$S_D(N) = \overline{F}\{F[S(t,L)] \cdot e^{-j \cdot f(D_{total}/N)}\}, \quad S(t,N) = S_D(N) \cdot e^{-j \cdot \alpha \cdot \Phi_{NL} \cdot |S_D(N)|^2/N}, \quad (2)$$

where F(x) and $\overline{F}$(y) are, respectively, the Fourier and inverse-Fourier transformation of signals x and y, j is the imaginary unit, f[D] represents the modification of the optical phase of the signal due to the dispersive effect resulting from CD with value D, and a is a normalization constant. In this embodiment, it is assumed that the N artificial segments have the same CD and SPM induced nonlinear phase shift. The first line of Eq. (2) considers the dispersion effect on the signal during the propagation in the N-th segment, and the second line take into consideration the nonlinear effect in the N-th segment. Note that detailed signal power evolution is not needed in computing Eq. (2). This allows the computation to be fast. Note that the development of this fast algorithm is based on the finding that the overall distortion on an optical signal due to SPM and CD in an optical fiber link is not sensitive to microscopic details of the signal power evolution and dispersion distribution of the link. Furthermore, the overall distortion is estimated with reasonable accuracy as long as the effective dispersion-induced pulse broadening by each artificial fiber segment is smaller than about one bit period.

In a further embodiment, for 10-Gb/s OOK with a 3-dB optical spectral bandwidth of about 0.1 nm, one bit-period change, i.e., 100 ps, in pulse broadening corresponds to a dispersion value of about 1000 ps/nm. For standard single-mode fiber (SSMF) with a dispersion coefficient of 17 ps/km/nm, and effective length of 20 km per span, the artificial fiber segment contains up to 3 such SSMF spans without losing much accuracy in estimating the pre-equalized waveforms. For a typical long-haul fiber transmission link, the number of the fiber spans is usually limited to 30. Thus, N=10 is a reasonable "guessed" value.

At step 240, repeat step 230 to compute the desired signal waveform for the given data pattern at the beginning of the i-th segment, S(t,i), as $$S_D(i)=\bar{F}\{F[S(t,i+1)] \cdot e^{-j \cdot f(D_{total}/N)}\}, S(t,i)=S_D(i) \cdot e^{-ja \cdot \Phi_{NL} \cdot |S_D(i)|^2/N}. \quad (3)$$

At step 250, S(t,1) is then the desired pre-equalized waveform for the given data pattern at the transmitter for simultaneous compensation of SPM and CD.

At step 260, the lookup table that containing all pre-equalized waveforms is updated.

At step 270, the in-phase and quadrature optical modulations are performed, through the modulator and I and Q drivers, using the analog waveforms generated by the DSP unit and the DACs based on is the data to be transmitted and the updated lookup table.

At step 280, the quality of the received signal is measured and the information regarding the signal quality is feedback to the DSP unit at the transmitting portion.

At step 290, the DSP unit improves the "guessed" values for the set of system parameters in order to obtain improved received signal quality. The algorithm then loops back to step 230 to achieve iteratively the optimal transmission performance, with the help of the continuous communication between the receiver and the transmitter. The $\Phi_{NL}$ values are confined in a certain range to ensure the reliability of the computation. For example, the value of $\Phi_{NL}$ is limited to within a range of approximately $[0, \pi]$.

As indicated above, the computation method does not require the knowledge of the detailed signal power evolution within each fiber segment, and does not need to solve the NLSE within each segment. The computation time is dramatically reduced, e.g., by more than 100 times. Furthermore, when the performance iteration described above is used, even macroscopic system parameters such as path-averaged signal power, fiber nonlinear coefficient, and/or dispersion, is not required. The computation method is capable of providing a fast "self-adapting" or "self-scanning" compensation for both SPM and CD in the EPE scheme.

What is claimed is:

1. An apparatus for pre-equalizing an optical signal at a transmitter, comprising:
    a digital signal processor (DSP), for determining a target pre-equalized signal waveform associated with an expected distortion of the optical signal by a fiber link, wherein the DSP determines the target pre-equalized signal waveform by:
    dividing the fiber link into N segments, wherein N is an integer greater than one, wherein the N-th segment is associated with a receiver and the first segment is associated with a transmitter; and
    iteratively computing a plurality of pre-equalized signal waveforms for the respective plurality of segments;
        wherein the pre-equalized signal waveforms are computed beginning with the N-th segment and ending with the first segment in a direction from the receiver toward the transmitter;
        wherein, for the N-th segment, the pre-equalized signal waveform associated with the N-th segment is computed using as input a desired waveform to be received by the receiver;
        wherein, for each of the remaining N-1 segments, the associated pre-equalized signal waveform computed for a current segment is computed using as input the pre-equalized signal waveform computed for the previous segment;
        wherein the target pre-equalized signal waveform determined by the DSP is the pre-equalized signal waveform associated with the first segment;
    digital to analog converters, for converting in-phase and quadrature-phase components of the target pre-equalized signal waveform into analog waveforms; and
    an electro-optical modulator, for encoding the analog waveforms onto an optical carrier to form a pre-equalized optical signal;
    wherein the DSP adaptively determines the target pre-equalized signal waveform according to receiver signal quality information received via a communication link.

2. The apparatus of claim 1, wherein the DSP further comprises a look-up table for storing information defining the target pre-equalized signal waveform determined by the DSP.

3. The apparatus of claim 2, wherein DSP operation is adapted by updating the lookup table in response to the receiver signal quality information.

4. The apparatus of claim 3, wherein the DSP uses values of a set of system parameters to determine each of the plurality of pre-equalized signal waveforms of the respective segments, wherein the DSP operates to iteratively adapt values of at least a portion of the set of system parameters to adapt the target pre-equalized signal waveform.

5. The apparatus of claim 1, wherein the DSP uses values of a set of system parameters to determine each of the plurality of pre-equalized signal waveforms of the respective segments, wherein the DSP selectively assigns nominal values for unknown system parameters or system parameters received from a network controller.

6. The apparatus of claim 1, wherein the DSP uses values of a set of system parameters to determine each of the plurality of pre-equalized signal waveforms of the respective segments, wherein the set of system parameters comprises a total chromatic dispersion (CD) of the fiber link, $D_{total}$, a mean total self-phase-modulation (SPM) induced nonlinear phase shift, $\Phi_{NL}$, a number of fiber segments, N, and a signal bit rate, BR.

7. The apparatus of claim 6, wherein the number of fiber segments N is approximately 10.

8. The apparatus of claim 6, wherein the mean total SPM induced nonlinear phase shift, $\Phi_{NL}$, is limited to within a range of approximately $[0, 3]$.

9. The apparatus of claim 6, wherein the DSP determines the pre-equalized signal waveform at the beginning of the N-th segment, S(t,N), as $$S_D(N)=\bar{F}\{F[S(t,L)] \cdot e^{-i \cdot f(D_{total}/N)}\}, S(t,N)=S_D(N) \cdot e^{-ja \cdot \Phi_{NL} \cdot |S_D(N)|^2/N},$$

wherein S(t,L) represents the desired waveform to be received by the receiver, F(x) and $\bar{F}$(y) are, respectively, the Fourier and inverse-Fourier transformation of signal x and y, j is the imaginary unit, f(D) represents the modification of the optical phase of the signal due to the dispersive effect resulting from a dispersion with a value of D, and "a" is a normalization constant.

10. The apparatus of claim 6, wherein, for each of the remaining N-1 segments, the DSP determines the pre-equalized signal waveform at the beginning of the i-th segment, S(t,i), as $$S_D(i)=\bar{F}\{F[S(t,i+1)] \cdot e^{-i \cdot f(D_{total}/N)}\}, S(t,i)=S_D(i) \cdot e^{-ja \cdot \Phi_{NL} \cdot |S_D(i)|^2/N},$$

wherein S(t,1) represents the target pre-equalized signal waveform at the transmitter for simultaneous compensation of SPM and CD.

11. The apparatus of claim 1, wherein the electro-optical modulator comprises one of a dual-drive Mach-Zehnder modulator and a nested Mach-Zehnder modulator.

12. A method for determining a target pre-equalized signal waveform for use in pre-equalizing an optical signal at a transmitter to compensate for the distortion of the optical signal traversing a fiber link toward a receiver, comprising:
dividing the fiber link into N segments, wherein N is an integer greater than 1, wherein the N-th segment is associated with the receiver and the first segment is associated with the transmitter;
iteratively computing a plurality of pre-equalized signal waveforms for the respective plurality of segments;
wherein the pre-equalized signal waveforms are computed beginning with the N-th segment and ending with the first segment in a direction from the receiver toward the transmitter;
wherein, for the N-th segment, the associated pre-equalized signal waveform is computed using as input the desired waveform to be received by the receiver;
wherein, for each of the remaining N-1 segments, the associated pre-equalized signal waveform computed for a current segment is computed using as input the pre-equalized signal waveform computed for the previous segment;
wherein the target pre-equalized signal waveform determined by a digital signal processor (DSP) is the pre-equalized signal waveform associated with the first segment; and
populating a lookup table with the target pre-equalized signal waveform.

13. The method of claim 12, wherein each of the plurality of pre-equalized signal waveforms of the respective segments is determined using values of a set of system parameters, further comprising assigning initial values for unknown ones of the system parameters.

14. The method of claim 12, wherein each of the plurality of pre-equalized signal waveforms of the respective segments is determined using values of a set of system parameters, further comprising assigning at least one value of at least one of the system parameters based on information from a network controller.

15. The method of claim 12, wherein each of the plurality of pre-equalized signal waveforms of the respective segments is determined using values of a set of system parameters, wherein the set of system parameters comprises a total chromatic dispersion (CD) of the fiber link, $D_{total}$, a mean total self phase modulation (SPM) induced nonlinear phase shift, $\Phi_{NL}$, a number of fiber segments, N, and a signal bit rate, BR.

16. The method of claim 15, wherein the number of fiber segments N is about 10.

17. The method of claim 15, wherein the mean total SPM induced nonlinear phase shift, $\Phi_{NL}$, is limited to within a range of approximately [0, 3].

18. The method of claim 12, wherein the pre-equalized signal waveform at the beginning of the N-th segment, S(t,N), is computed as:

$$S_D(N)=\overline{F}\{F[S(t,L)]\cdot e^{-i\cdot f(D_{total}/N)}\}, S(t,N)=S_D(N)\cdot e^{-j\alpha\cdot\Phi_{NL}\cdot|S_D(N)|^2/N},$$

wherein S(t,L) represents the desired waveform to be received by the receiver, F(x) and $\overline{F}$(y) are, respectively, the Fourier and inverse-Fourier transformation of signal x and y, j is the imaginary unit, f(D) represents the modification of the optical phase of the signal due to the dispersive effect resulting from a dispersion with a value of D, and "a" is a normalization constant.

19. The method of claim 12, wherein, for each of the remaining N-1 segments, the pre-equalized signal waveform computed at the beginning of the i-th segment, S(t,i), is computed as:

$$S_D(i)=\overline{F}\{F[S(t,i+1)]\cdot e^{-i\cdot f(D_{total}/N)}\}, S(t,i)=S_D(i)\cdot e^{-j\alpha\cdot\Phi_{NL}\cdot|S_D(i)|^2/N},$$

wherein S(t,1) represents the target pre-equalized signal waveform at the transmitter for simultaneous compensation of self phase modulation and chromatic dispersion.

20. The method of claim 12, wherein each of the plurality of pre-equalized signal waveforms of the respective segments is determined using values of a set of system parameters, and further comprising:
adapting the target pre-equalized signal waveform using updated values of at least a portion of the system parameters to obtain thereby improved received signal quality, wherein the received signal quality is measured by the bit error rate (BER).

21. The method of claim 12, wherein each of the plurality of pre-equalized signal waveforms of the respective segments is determined using values of a set of system parameters, and further comprising:
adapting the target pre-equalized signal waveform using updated values of at least a portion of the system parameters to obtain thereby improved received signal quality, wherein the improved received signal quality is measured using an eye diagram.

22. The method of claim 12, further comprising establishing the lookup table using a training bit sequence.

23. The method of claim 22, wherein the training bit sequence is a pseudo random bit sequence (PRBS).

24. The method of claim 12, wherein each of the plurality of pre-equalized signal waveforms of each of the segments is determined using values of a set of system parameters, and further comprising:
updating the set of system parameters, to obtain thereby improved received signal quality, with a fixed value of a mean total self phase modulation (SPM) induced nonlinear phase shift, $\Phi_{NL}$.

25. The method of claim 24, wherein the $\Phi_{NL}$ is fixed at about 1 radian.

26. The method of claim 12, wherein the step of iteratively computing changes a value of a mean total self phase modulation induced nonlinear phase shift, $\Phi_{NL}$, within the range of approximately [0, 3] by a step size of about 0.3 radians.

* * * * *

UNITED STATES PATENT AND TRADEMARK OFFICE
CERTIFICATE OF CORRECTION

PATENT NO. : 7,660,537 B2
APPLICATION NO. : 11/367141
DATED : February 9, 2010
INVENTOR(S) : Fishman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Twenty-eighth Day of December, 2010

David J. Kappos
*Director of the United States Patent and Trademark Office*